Nov. 7, 1967
G. E. MURRAY
3,350,823
INSULATED SKYLIGHT
Filed Oct. 30, 1963
2 Sheets-Sheet 2
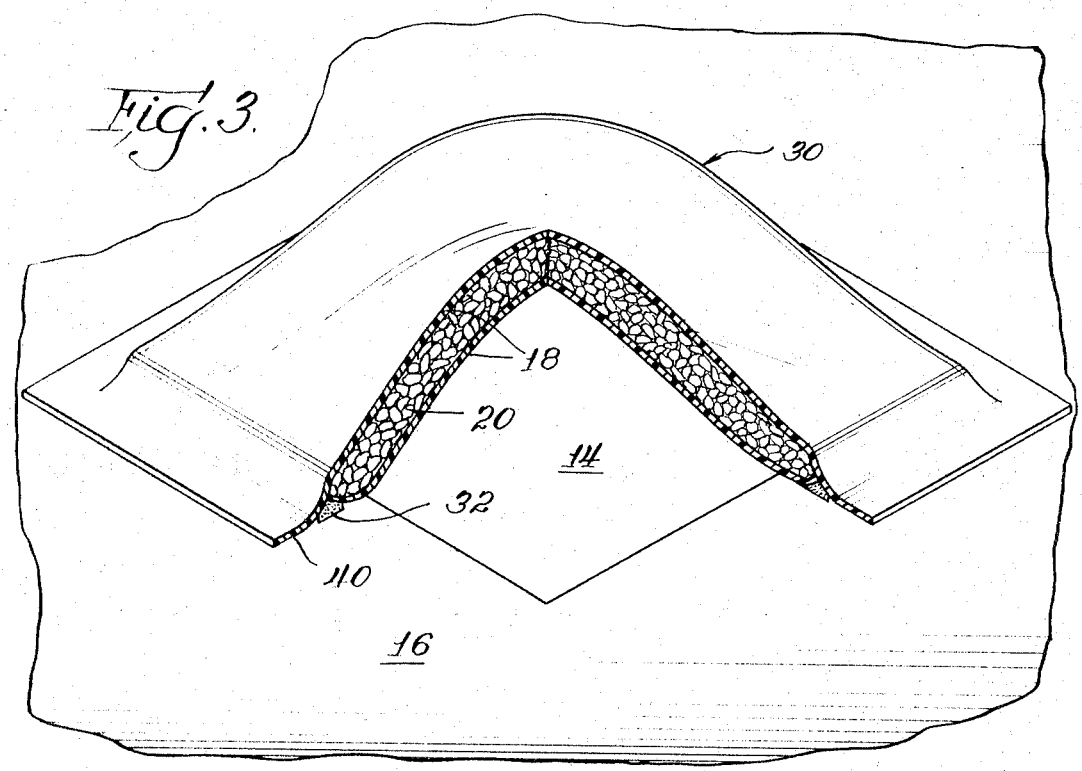
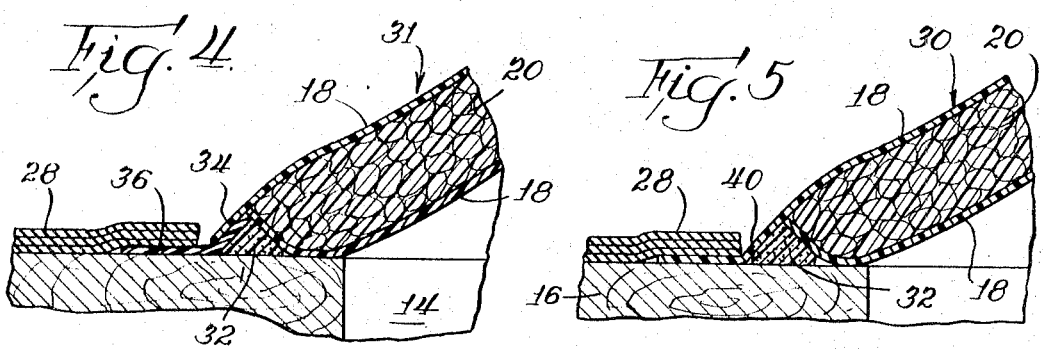
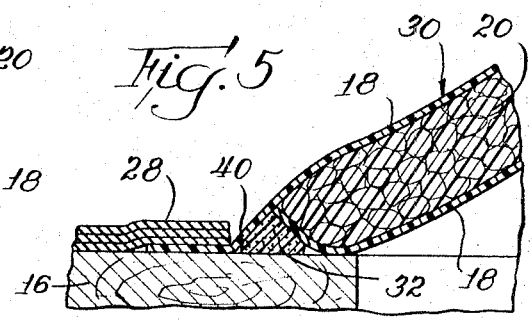
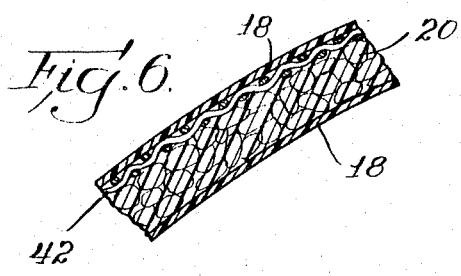
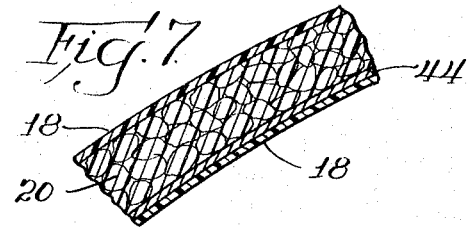
INVENTOR.
George E. Murray
BY
Dominik, Rudy & Stein
Att'ys.

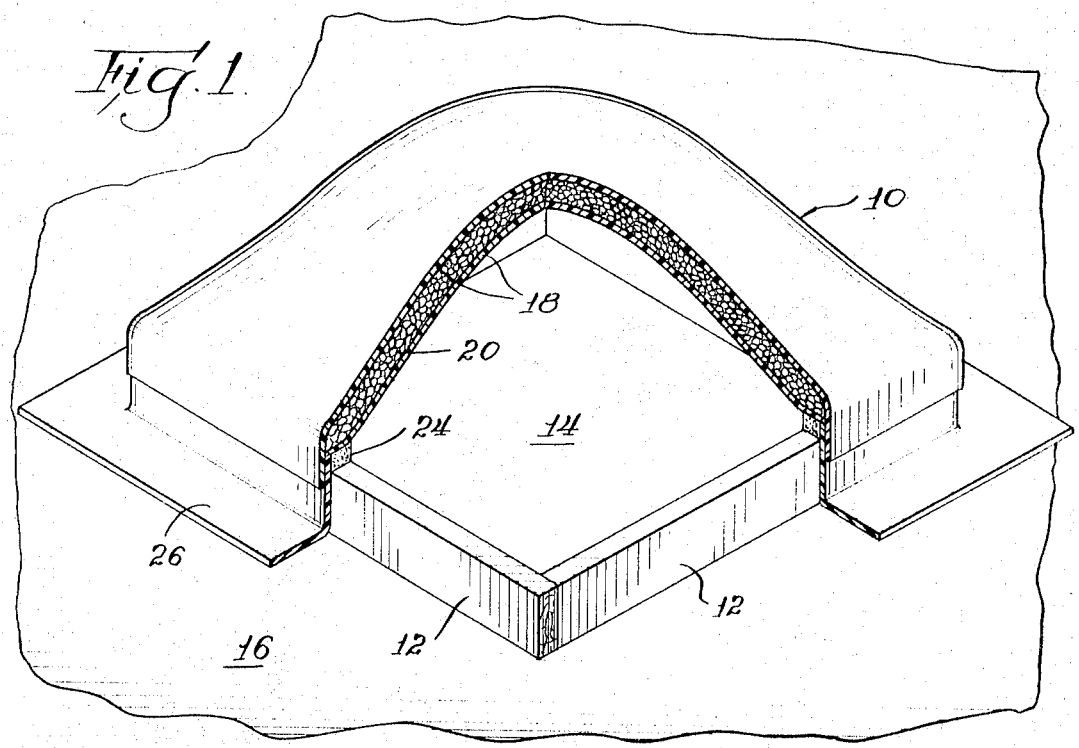
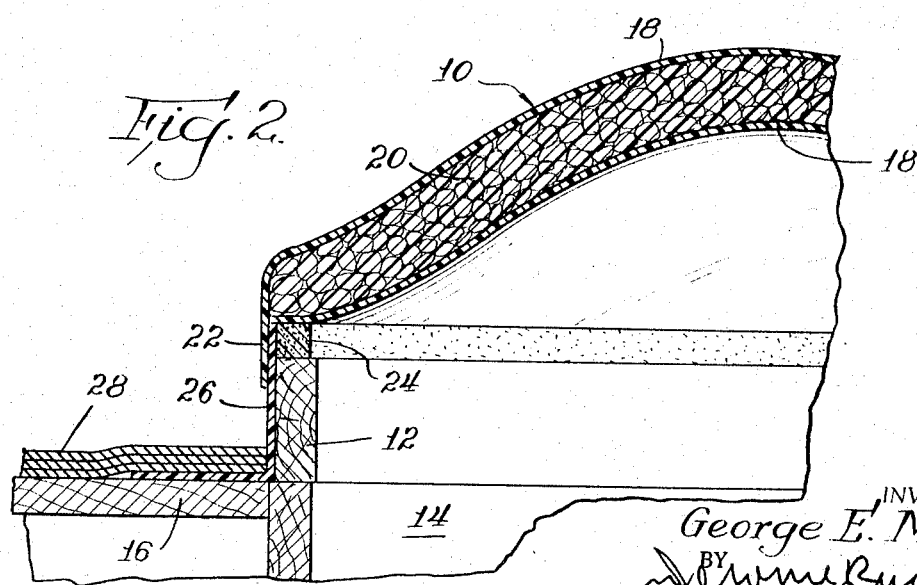

United States Patent Office 3,350,823
Patented Nov. 7, 1967

3,350,823
INSULATED SKYLIGHT
George E. Murray, Midland, Mich., assignor to The Dow Chemical Company, Midland, Mich., a corporation of Delaware
Filed Oct. 30, 1963, Ser. No. 320,172
1 Claim. (Cl. 52—200)

This invention relates to an improvement in skylights, and more particularly to a skylight made from a laminated plastic, which provides a high degree of insulation, along with other advantages.

Skylights made from plastic are of course known, and existing products on the market are mainly free blown acrylic domes produced by the same industries that were in the acrylic bubble airplane canopy business during World War II, and thereafter. While such plastic skylights have in general represented an improvement in the art, they have had certain inherent short-comings which the skylight of the present invention overcome. For example, the acrylic generally used is a crystal clear material, and for most installations, tinting or treating to diffuse direct sunlight to prevent excessive glare, is required. Furthermore, since a single layer of acrylic sheet is not a good insulator, skylights made of this material present considerable condensation problems. To correct this, multiple layer units have been designed wherein the dead air space between the layers is relied upon for insulation purposes. Such type of construction is not only expensive, but definite problems arise in sealing the multiple layers to avoid condensation therebetween. With regard to acrylic single sheet skylights, elaborate aluminum condensation gutters and moldings containing gaskets with weep holes, were designed to aid in the expulsion of condensate to the outside air. Such an arrangement does not provide an air-tight construction, hence, seriously limits the field of application. Furthermore, a single sheet domed skylight often causes problems because of its ability to function as a magnifying glass, whereby concentrated light rays may be transmitted into the space below the skylight.

The plastic skylight of the present invention represents a definite improvement in the art. Briefly, the subject plastic skylight comprises a laminate including a large cell methylmethacrylate-styrene foam core which is thermally bonded to inner and outer sheets of methylmethacrylate-styrene to form a rigid sandwich. The plastic material used in said sandwich may be of the type produced by the Dow Chemical Company under the trade mark Zerlon. Such a skylight has excellent insulation properties, and many unique color effects can be produced with color foams and sheets. Furthermore, the large cell foam core, provides good diffusion of light, e.g. sunlight, thereby preventing any glare, as is common with the acrylic skylights. In addition, the skylight of the invention represents a fully sealed construction, which automatically avoids condensation problems. A most important distinguishing characteristic of the subject plastic skylight, is its relatively low cost, not only from the standpoint of mineral and fabrication, but also minimal on-the-job installation cost. If desired, the subject skylight can be made entry resistant by the addition of a wire grid to the laminate during fabrication. Likewise, a fire-proof membrane could be installed in the same manner. Finally, the subject skylight can be made for either curb type installation, or flush type installation.

The main object of this invention is to provide an improvement in skylights, more particularly skylights made of plastic materials.

A more specific object is to provide a plastic laminate skylight which has good insulation as well as light diffusion properties.

A further object is to provide a plastic laminate skylight which is of light weight, and of relatively high strength.

A further object of this invention is to provide a plastic laminate skylight wherein internal condensation problems are avoided.

Still another object of this invention is to provide a plastic laminate skylight which has low initial fabrication cost as well as low installation cost.

A further object of this invention is to provide a plastic laminate skylight which may be used for different type installations, such as curb type installations, or flush type installations.

These and further objects and features of the invention will become more apparent from the following description and accompanying drawings wherein:

FIG. 1 is a perspective-like view of a skylight embodying the principles of the invention, as used for curb type installations, and with a portion cut away to illustrate certain detail structure;

FIG. 2 is a fragmentary enlarged vertical cross section view of the skylight of FIG. 1;

FIG. 3 is a perspective-like view of a second embodiment of the invention illustrating a skylight as used for flush type installations;

FIG. 4 is a fragmentary vertical section view illustrating a detail of a skylight as used in flush type installations;

FIG. 5 is a fragmentary vertical section view illustrating a detail of the skylight shown in FIG. 3;

FIG. 6 is a section view taken through a skylight made according to the principles of the invention and showing a entry-resistant screen forming part of the laminate thereof; and FIG. 7 is the same but showing a fire-proof membrane in the laminate, in lieu of an entry-resistant screen.

Referring now to the drawings and more particularly to FIGS. 1 and 2, a skylight 10 is shown, which skylight embodies the principles of the invention. The skylight 10 is the type for use in curb type installations, such as provided by the frame members 12 arranged about the periphery of an opening 14, formed in a roof 16. As clearly seen in FIG. 2, the skylight has a curved, or dome-like configuration and consist of an inner and an outer sheet 18, in generally parallel relation, which sheets are secured to a core 20. The sheet material 18 is preferably formed of methylmethacrylate-styrene, while the core 20 is formed of a foam made from methylmethacrylate-styrene.

The entire laminate, or sandwich structure is made in a forming mold utilizing an optimum temperature as required for forming and laminating the material, which temperature is within a range of 260° to 300° F.

The foam material is characterized as a conglomerate of large polyhedral cells which are heterogeneously arranged, and have common walls extending at various angles. Such a large cell structure is of extremely light weight, and the various angles of the cell walls provide a pleasing honeycombed aesthetic appearance with good light diffusion and light defraction properties. In one inch thickness of such foam material having cell sizes ranging from ⅜″ to ½″ in diameter, light transmission is about 65%, and the K factor is .48 to .52.

As an alternative method to formation of the skylight in a mold, as described above, it may be desirable to prepare the laminate as the hot sheet material 18 comes from an extruder, and to introduce the foam 20 therebetween so that lamination can be made right at the extruder following which the laminate could be shaped in molds without destroying any of the adhesion, or bonding effect achieved during the laminating process.

The outer sheet 18 is advantageously formed with a skirt, or overhang 22 which extends about the frame members 12.

While many different types of structural arrangements may be used to position the skylight upon the framing 12, the arrangement shown in FIG. 2 will prove satisfactory for many different installations. As seen therein, a plastic gasket, or strip 24, which may be made of a foam material such as that produced by The Dow Chemical Company under the trade name Ethafoam, is secured by adhesive to the top of the frame members 12. The skylight assemblage 10 is seated upon the gasket 24, and the skirt 22 is bonded to a flashing strip 26 arranged around the frame members 12. The flashing 26 may be of any suitable material, one of which is satisfactory for intended usage being that made by The Dow Chemical Company and identified by their trade name Saraloy 400. A built-up roof material 28, made of standard type bituminus roofing material, is arranged to over-lap the flashing 26. Suitable adhesives are used to cement the edges of the roofing sheets 28 in position upon the flashing 26.

The skylight may be made in standard sizes for use in a majority of the skylight installations. The proportions of the dome-like configuration, may be easily established utilizing standard strength of material formulae, or in the alternative, may be established by simple experimentation. While the skylight illustrated is for use with a rectangular, or square opening, it will be apparent that the skylight may be designed for circular openings if desired.

In FIG. 3 a modified embodiment of the invention is illustrated which embodiment is for use in flush type installations. As seen therein, a domed skylight 30 is formed of the inner and outer sheets 18 and core material 20, as in the case of the skylight 10. The main difference between the two embodiments is in the manner of affixing, or positioning the skylight about the opening 14.

Two arrangements for positionally affixing the dome 30 above an opening 14, may be utilized. As seen in FIG. 4 a skylight 31 has a lower sheet 18 which may be formed to make direct contact with the peripheral portion of the opening 14 in the roof, said sheet being curved upward to engage the bottom surface of the outer sheet 18. A gasket, or strip 32 positioned about the hole 14 and cemented to the roof 16, is engaged by the curved portion of the lower sheet 18. The upper sheet 18 has a overhang, or skirt portion 34 which extends over the gasket material 32. A flashing material 36 is arranged to be sandwiched between the over-hang portion 34 and the gasket 32. Suitable resin adhesive is utilized for maintaining the over-hang 34 and flashing 36 in fixed engagement with the gasket 32. The built-up roofing 28 is arranged for over-laying the flashing 36, and may be cemented thereto by standard type mastic as used in sheet roof formations.

In FIG. 5, another positioning arrangement is shown, for fixing the skylight 30. The skylight assemblage 30, is arranged so that the upper sheet extends a considerable distance to form a over-hang, or skirt portion 40 which not only engages the strip 32, but also engages the bare roof. The built-up roofing material 28 is positioned to over-lap the flange portion 40 of the sheet 18. A chemical bond, such as provided by a resin adhesive, is formed between the portions of the skylight which abut the flange 32, while a mastic may be used for cementing the roof material to the flange 40.

Variations in laminate structure may be utilized. For example, in FIG. 6 a section of skylight construction is shown wherein a metal grid, or screening 42 is arranged within the laminate. Such type of structure is useful for skylights which are to have an entry resistant feature. In FIG. 7 a section of skylight is illustrated wherein a fire-proofing membrane 44 is utilized in the laminate between the inner layer 18 and the foam core 20. Such a fire-proofing membrane could be made of various materials, such as a fibre glass impregnated with a chlorophenol.

The variations disclosed with reference to FIGS. 6 and 7 illustrate possibilities which may be obtained utilizing the basic principle of the invention. Other variations, or modifications are of course possible, such as utilizing metal for strengthening the laminate in applications where in great strength is required, as in a long and narrow skylight.

In any event, it will be apparent that any of the embodiments disclosed above will satisfy all of the objectives set forth hereinbefore. The savings available in utilizing the skylight of the subject invention are extremely attractive. Current estimates of the cost of a skylight made in accordance with the principles of the invention, as compared to a similar size skylight made of double faced acrylic domes, show that a savings as high as 75 to 80% may be realized with the skylight of the subject invention. Certain tests have indicated that a one inch thickness of the foam 20 adhered to a plastic face, has twice the insulating value of a hermetically sealed, double glazed thermal window. In addition to heat sealing for production of the laminate described herein, it may be desirable, under certain conditions, to use adhesives, such as epoxy, acrylic and polyvinyl acetate.

The foregoing description has been given in detail without thought of limitation since the inventive principles involved are capable of assuming other forms without departing from the spirit of the invention or the scope of the following claim.

What is claimed is:

In a roof construction having an opening, a plastic skylight comprising an outer sheet of light transmitting plastic material, an inner sheet of light transmitting plastic material, and a light transmitting plastic foam material fixedly disposed between said outer and inner sheets of plastic material which is characterized as a conglomerate of large polyhedral cells which are heterogeneously arranged and have common walls extending at various angles, the peripheral edge of said inner sheet being affixed to the interior surface of said outer sheet and said outer sheet being extended to provide a skirt for overlapping and for securing said skylight to the roof about the opening, the interior periphery of said inner sheet further being adapted to be bonded to a gasket affixed to the roof about the periphery of the opening for said skylight and said skirt on said outer sheet further being bonded to said gasket and secured to the roof about the opening in a fashion such as to be covered with roofing material.

References Cited
UNITED STATES PATENTS

| | | | |
|---|---|---|---|
| 2,918,023 | 12/1959 | Bettcher | 52—615 X |
| 3,127,699 | 4/1964 | Wasserman | 52—200 X |
| 3,177,109 | 4/1965 | Ziegler | 161—161 |

DAVID J. WILLIAMOWSKY, *Primary Examiner.*

HARRISON R. MOSELEY, *Examiner.*

J. K. BELL, *Assistant Examiner.*